3,061,468
Patented Oct. 30, 1962

3,061,468
METHOD OF RENDERING FOAMED POLYSTYRENE SURFACES FLAME RESISTANT
Ward Roy Tryon, Midland, Mich., assignor to The Dow Chemical Company, Midland, Mich., a corporation of Delaware
No Drawing. Filed Oct. 6, 1960, Ser. No. 60,779
8 Claims. (Cl. 117—138)

This invention relates to a method of rendering cellular thermoplastic resinous bodies resistant to the action of flame. More specifically, it relates to a method of treating the surface of such bodies to provide a barrier coating therefor that is flame resistant.

When the resinous material from which a cellular body is made is itself flammable, it is evident that a foamed or cellular body produced therefrom, because of its open structure and relatively great surface, is more prone to ignition on the application of a flame. This enhanced flammability of the foamed material over that of the parent resinous substance can introduce serious problems in the utilization of these valuable materials.

The problem of flammability can, of course, be met in part by certain treatments of the resin from which the foamed material is made. Thus, the resin may be modified chemically or it may be simply mechanically blended with various fillers and flame retarding agents prior to its being formed into a cellular structure. This method of meeting the difficulty, however, is open to several objections. The expense occasioned by the additional processing steps required may render the use of the cellular material finally resulting impractical for economic considerations. Additionally, the use of additives conceivably can undesirably alter certain properties of the cellular material, such as color, color stability, bulk density and the like. In any event, for many applications only the surface of the cellular material need be rendered flame resistant and treatment of the whole mass of the resin is thereby unwarranted.

It is therefore a principal object of the present invention to provide a method of rendering flame resistant a surface of a cellular, thermoplastic resinous body. In particular, it is the object of the invention to provide a method of coating such a body so as to render it thus resistant to the action of flame. Additionally, it relates to the materials adapted to the formation of such coatings.

The deposition of a continuous coating on the surface of a resinous material, such as polystyrene, from an aqueous medium is rendered difficult because of the poor wettability by water of such surfaces. Nevertheless, it has unexpectedly been discovered that coatings of certain inorganic salts may be so deposited on the surface of cellular bodies of such resinous materials and that the resultant coatings are effective to lend flame resistance to the thus coated surfaces.

The materials contemplated to be employed in the practice of the invention in the production of flame resistant coatings on a cellular, resinous substrate are magnesium sulfate, the chlorides of calcium and magnesium, and mixtures thereof. These salts are employed as concentrated aqueous solutions, preferably those solutions that are saturated with respect to the salt in question.

The solutions from which the flame resistant coatings are to be deposited may be applied to the desired surface in any convenient manner such as by brushing, spraying or by dipping the object desired to be coated in a bath of the solution. The coating itself is formed by the evaporation of the aqueous solvent from the applied solution. Such evaporation may be permitted to take place at ambient temperature. However, it is usually more convenient to dry the solution treated surface at a somewhat elevated temperature which must, of course, be below the softening temperature of the cellular substrate.

The deposited coatings are, in general, clear and colorless and thus in no way do they alter the appearance of the supporting substrate. This is of particular importance in the treatment of decorative items such as advertising display pieces where both the texture and color of the item may be of importance.

The invention is illustrated in and by the following examples, which are intended to be illustrative only and not limiting and wherein all parts and percentages are on a weight basis.

*Example 1*

A sample section measuring 1" x 1" x 6" was cut from a block of foamed polystyrene. This sample was totally immersed in a bath containing a saturated solution of calcium chloride for a period of one minute. It was then removed, drained of excess solution, placed in an oven maintained at 75° C. and kept therein for a period of hours. The burning characteristics of the treated, dry sample were determined in the following manner.

The sample was placed in a clamp and held so that its lengthwise axis was horizontal and its upper face essentially level. A small flame from a Bunsen burner was brought into contact with the free end of the sample at its bottom edge and maintained there until the sample ignited. The flame was then removed and the sample allowed to burn freely. The time between application of the flame and the ignition of the sample was noted, as was the time required for the burning zone to reach a point 2 inches back from the ignited end. It was found that 10 seconds of flame contact were necessary to ignite the sample and that an additional 39 seconds were required for the burning zone to travel 2 inches.

A similar test was made using an untreated sample of foamed polystyrene of the same dimensions. The values determined, hereinafter referred to as ignition time and combustion time, were 1 second and 22 seconds respectively.

*Example 2*

In a manner comparable to that described in Example 1, a foamed polystyrene sample was treated with a saturated solution of magnesium sulfate and dried. Ignition time for the treated sample was found to be 27 seconds; combustion time was approximately 75 seconds.

*Example 3*

Equal parts of saturated solutions of calcium chloride and of magnesium sulfate were mixed with stirring. The precipitated calcium sulfate was removed by filtration and the resulting filtrate reduced to approximately one half of its volume by heating. This concentrated filtrate was brushed on a foamed polystyrene sample which was dried as described in Example 1. An ignition time of 37 seconds was determined; combustion time was approximately 48 seconds.

What is claimed is:

1. A method of imparting flame resistance to the surface of a foamed polystyrene body comprising depositing on said surface a coating of an inorganic salt selected from the group consisting of calcium chloride, magnesium chloride, magnesium sulfate and a mixture of calcium chloride and magnesium chloride.

2. A method of imparting flame resistance to the surface of a foamed polystyrene body comprising the steps of applying to said surface an aqueous solution of an inorganic salt selected from the group consisting of calcium chloride, magnesium chloride, magnesium sulfate and a mixture of calcium chloride and magnesium chloride and permitting the aqueous phase to evaporate from said applied solution whereby to deposit said magnesium salt on said surface.

3. A method of imparting flame resistance to the surface of a foamed polystyrene body comprising the steps of applying to said surface an aqueous solution of an inorganic salt selected from the group consisting of calcium chloride, magnesium chloride, magnesium sulfate and a mixture of calcium chloride and magnesium chloride and exposing said surface to an atmosphere maintained at a temperature below the softening point of said resinous body for a period of time sufficient to cause the evaporation of the aqueous phase of said applied solution whereby to deposit said inorganic salt on said surface.

4. A method of imparting flame resistance to the surface of a foamed polystyrene body comprising the steps of applying to said surface an aqueous solution of an inorganic salt selected from the group consisting of calcium chloride, magnesium chloride, magnesium sulfate and a mixture of calcium chloride and magnesium chloride, said aqueous solution being substantially saturated with respect to the inorganic salt, and permitting the aqueous phase to evaporate from said applied solution whereby to deposit said magnesium salt on said surface.

5. A method as set forth in claim 4 wherein the inorganic salt is magnesium sulfate.

6. A method as set forth in claim 4 wherein the inorganic salt is magnesium chloride.

7. A method as set forth in claim 4 wherein the inorganic salt is calcium chloride.

8. An article of manufacture comprising a foamed polystyrene body bearing on at least one face thereof a substantially uniform deposit of an inorganic salt selected from the group consisting of calcium chloride, magnesium chloride, magnesium sulfate and a mixture of magnesium chloride and calcium chloride.

References Cited in the file of this patent

UNITED STATES PATENTS

| | | |
|---|---|---|
| 2,450,436 | McIntire | Oct. 5, 1948 |
| 2,920,983 | Bugash | Jan. 12, 1960 |

FOREIGN PATENTS

| | | |
|---|---|---|
| 1,937 | Great Britain | of 1864 |

OTHER REFERENCES

Flameproofing Textile Fabrics, Little, 1947, pp. 50, 77, 82, 83, 169, 177 and 299–300, pertinent.